US012117004B2

(12) United States Patent
Kim et al.

(10) Patent No.: US 12,117,004 B2

(45) Date of Patent: Oct. 15, 2024

(54) PROGRESSIVE CAVITY PUMP

(71) Applicant: PROTEC CO., LTD., Gyeonggi-do (KR)

(72) Inventors: Keon Hee Kim, Incheon (KR); Hwan Seong Park, Gyeonggi-do (KR)

(73) Assignee: PROTEC CO., LTD., Gyeonggi-do (KR)

( * ) Notice: Subject to any disclaimer, the term of this patent is extended or adjusted under 35 U.S.C. 154(b) by 0 days.

(21) Appl. No.: 18/470,439

(22) Filed: Sep. 20, 2023

(65) Prior Publication Data

US 2024/0093685 A1 Mar. 21, 2024

(30) Foreign Application Priority Data

Sep. 20, 2022 (KR) ........................ 10-2022-0118356

(51) Int. Cl.

| | |
|---|---|
| ***F04C 2/10*** | (2006.01) |
| ***B05B 9/08*** | (2006.01) |
| ***B05C 5/02*** | (2006.01) |
| ***B05C 11/10*** | (2006.01) |
| ***F04C 2/107*** | (2006.01) |
| ***F04C 2/16*** | (2006.01) |
| ***F04C 13/00*** | (2006.01) |
| ***F04C 14/22*** | (2006.01) |
| ***F04C 15/06*** | (2006.01) |

(52) U.S. Cl.

CPC .............. *F04C 2/107* (2013.01); *B05C 11/10* (2013.01); *F04C 2/16* (2013.01); *F04C 13/002* (2013.01); *F04C 14/22* (2013.01); *F04C 15/06* (2013.01); *F04C 2240/30* (2013.01); *F04C 2240/806* (2013.01)

(58) Field of Classification Search

CPC .. F04C 15/06; F04C 2/16; F04C 2/107; F04C 2240/20; F04C 2240/30; B05B 9/0855; B05C 11/10; B05V 5/02

See application file for complete search history.

(56) References Cited

U.S. PATENT DOCUMENTS

| | | | | |
|---|---|---|---|---|
| 3,802,803 A * | 4/1974 | Bogdanov | F04B 47/06 418/48 |
| 6,129,040 A | 10/2000 | Viggiano et al. | |
| 6,234,358 B1 * | 5/2001 | Romine | B23K 3/0607 222/413 |

(Continued)

FOREIGN PATENT DOCUMENTS

| | | |
|---|---|---|
| KR | 100865254 | 10/2008 |
| KR | 100954872 | 4/2010 |
| KR | 20200137669 | 12/2020 |

*Primary Examiner* — Deming Wan

(74) *Attorney, Agent, or Firm* — JCIPRNET

(57) ABSTRACT

Provided is a progressive cavity pump. The progressive cavity pump operates such that a viscous liquid is discharged by rotating an eccentric rotor with respect to a stator. The progressive cavity pump may be easily disassembled for repair and maintenance, and may be easily attached to an accurate position during re-assembly. Also, in the progressive cavity pump, main components such as a nozzle, a rotor, a stator, etc. may be easily replaced so as to easily adjust dispensing characteristic, while the driving units such as a motor and a rotary shaft are installed in a dispenser, and thus, an idle time of the dispenser may be reduced.

8 Claims, 4 Drawing Sheets

(56) References Cited

U.S. PATENT DOCUMENTS

| | | | | |
|---|---|---|---|---|
| 7,331,482 | B1 * | 2/2008 | Fugere | B05C 5/02 222/413 |
| 8,439,227 | B2 * | 5/2013 | Ikushima | B05C 11/1026 222/413 |
| 2020/0166031 | A1 * | 5/2020 | Suttmann | F04C 2/1071 |

* cited by examiner

PROGRESSIVE CAVITY PUMP

CROSS-REFERENCE TO RELATED APPLICATION

This application is based on and claims priority under 35 U.S.C. § 119 to Korean Patent Application No. 10-2022-0118356, filed on Sep. 20, 2022, in the Korean Intellectual Property Office, the disclosure of which is incorporated by reference herein in its entirety.

BACKGROUND

1. Field

The present disclosure relates to a progressive cavity pump, and in particular, to a progressive cavity pump for discharging a viscous liquid by rotating an eccentric rotor with respect to a stator.

2. Description of the Related Art

Eccentric screw pumps which discharge viscous liquid through a nozzle by inserting and rotating a rotor formed in a similar structure to a male screw into a stator in which a spiral-type female screw recess is formed are used in various industrial fields. Such an eccentric screw pump is also referred to as a progressive cavity pump.

A progressive cavity pump is capable of easily dispensing materials such as high-viscous liquid or solid powder, etc. that are difficult to be dispensed, and accurately controlling a dispensing amount. Also, low-viscous liquid may be effectively dispensed, and viscous liquid having viscosity that is variable according to time or temperature may be dispensed with accurate capacity. Also, an eccentric screw pump may apply the viscous liquid constantly in a uniform flow rate without any change in flow rate over time.

An eccentric screw pump has a structure, in which a rotor is connected to a motor so as to rotate the rotor with respect to a stator, and in general, it is inconvenient to disassemble or clean the structure for repair and maintenance.

When high-viscous liquid or viscous liquid of which hardening is progressed relatively fast is dispensed by using an eccentric screw pump, an eccentric screw pump having a structure that is easy to clean, replace, or repair main elements such as a nozzle, a rotor, etc. is necessary.

SUMMARY

The present disclosure provides a progressive cavity pump having a structure that is easy to be disassembled for repair and maintenance such as cleaning, and at the same time, is easy to be re-assembled and attached.

Additional aspects will be set forth in part in the description which follows and, in part, will be apparent from the description, or may be learned by practice of the presented embodiments of the present disclosure.

According to an embodiment, there is provided a progressive cavity pump including: a motor; a rotary shaft coupled to the motor and rotated; a rotor eccentrically connected to the rotary shaft and rotated; a stator including a rotor reception portion that extends in up and down directions so that the rotor is inserted therein, has a female screw recess formed in an inner wall surface, and stores a viscous liquid; and a nozzle formed to be in communication with the rotor reception portion so that the viscous liquid is discharged by a pressing force that is generated in the rotor reception portion due to the rotation of the rotor, and the progressive cavity pump further includes: a support housing including a motor support that is coupled to the motor to support the motor and a shaft support that is formed so that the rotary shaft passes and supports the rotary shaft to be rotatable; and a stator body including the stator and the nozzle and coupled to the support housing to be attachable/detachable.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
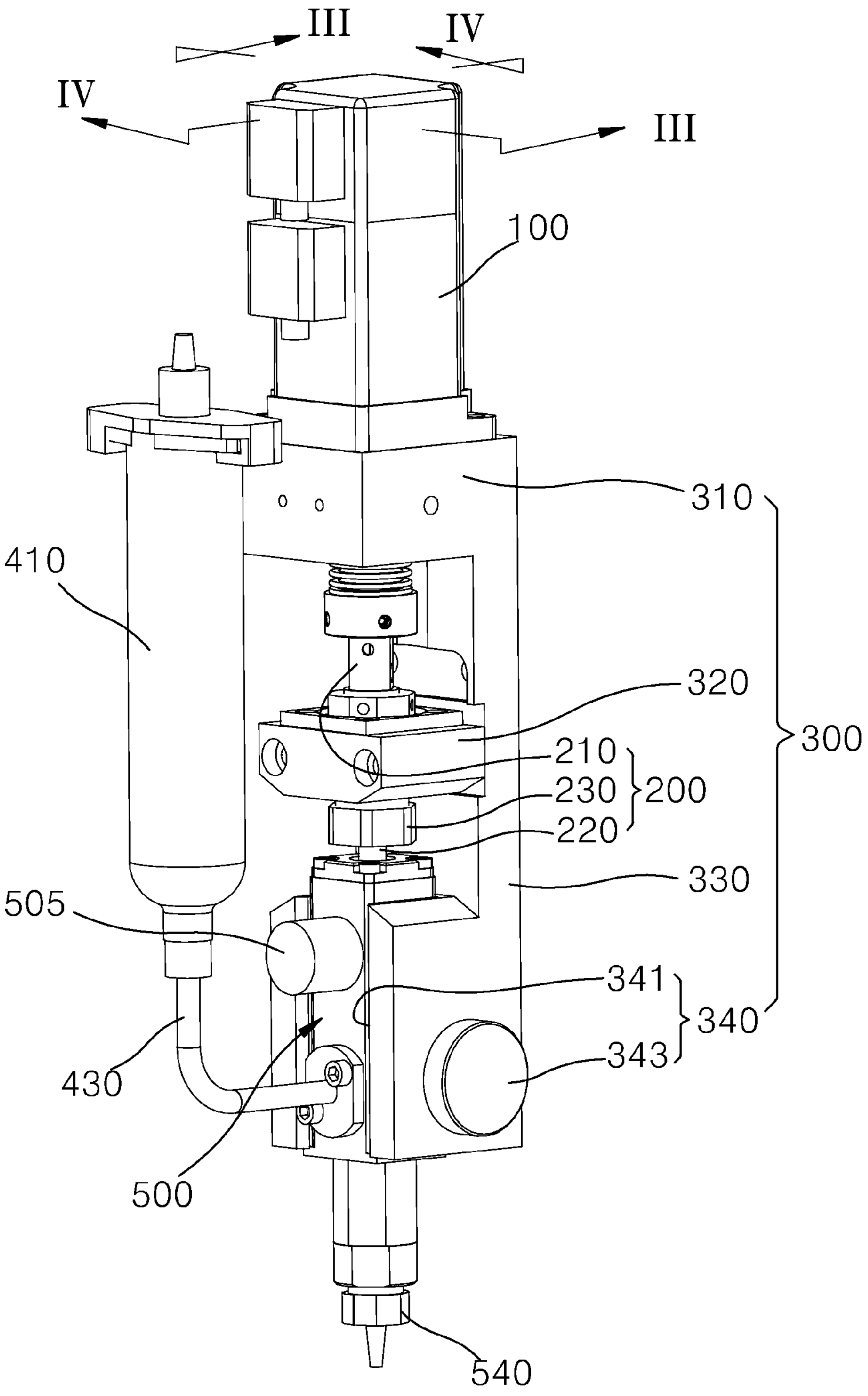
FIG. 1 is a perspective view of a progressive cavity pump according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, a progressive cavity pump according to one or more embodiments of the present disclosure is described in detail later with reference to accompanying drawings.

Figure 2:
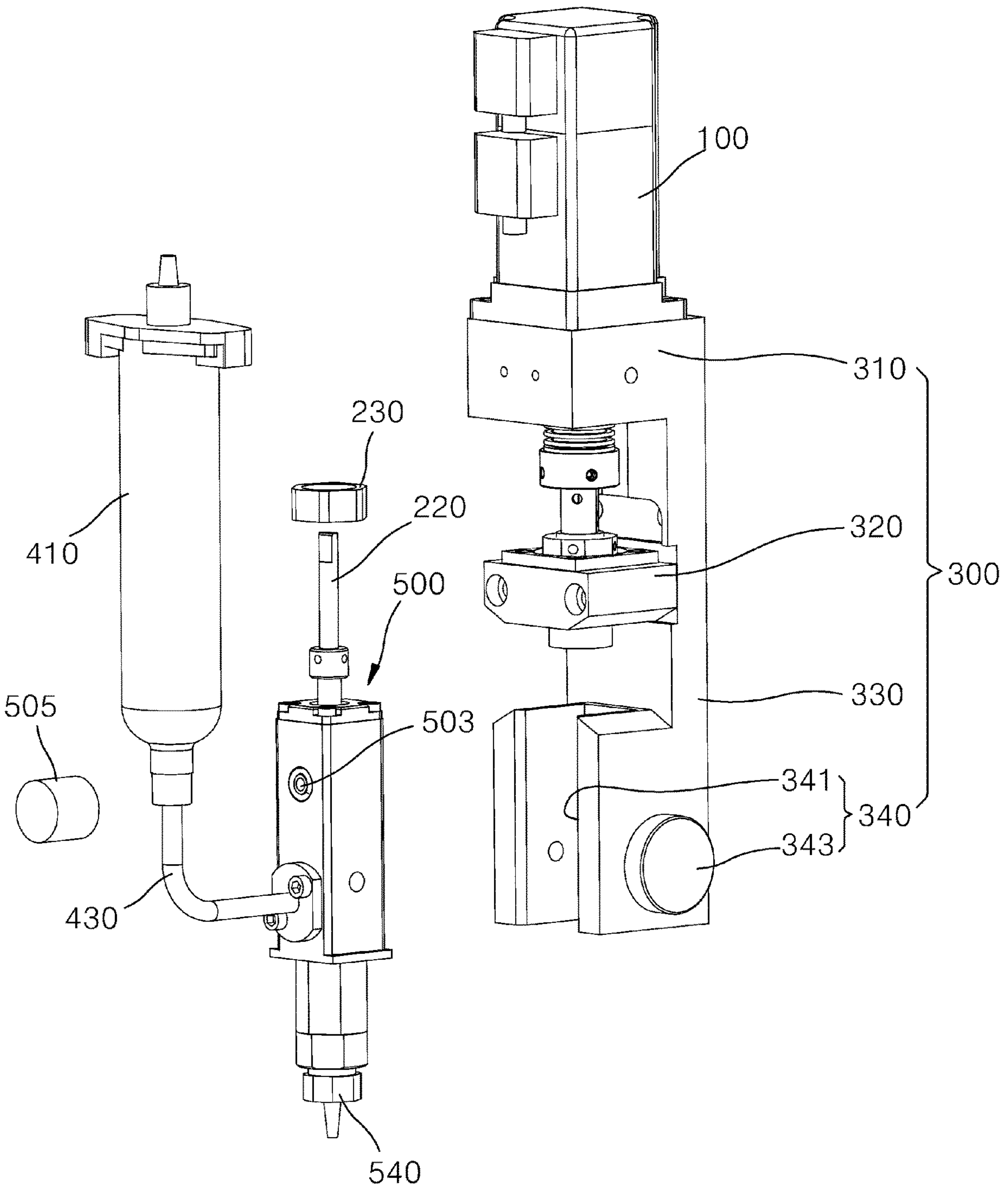
FIG. 2 is an exploded perspective view of the progressive cavity pump of FIG. 1.
Figure 3:
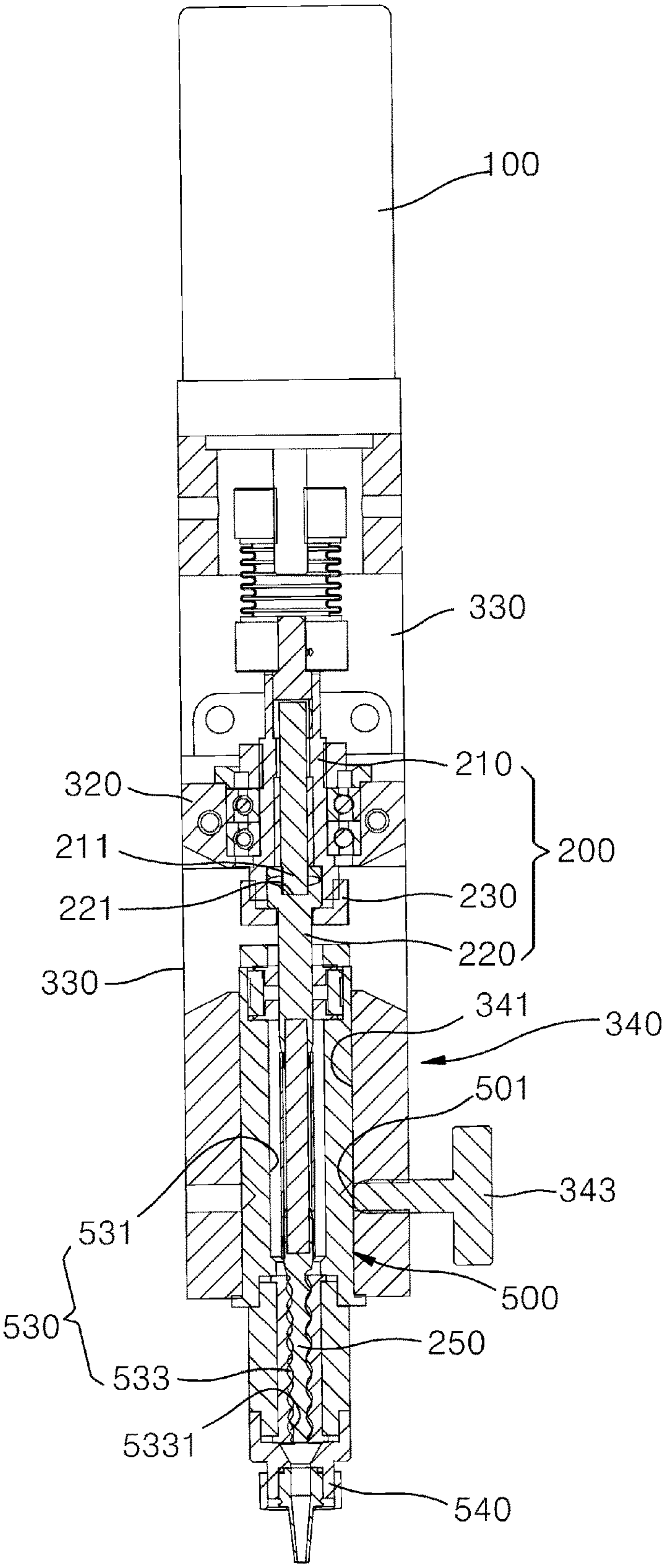
FIG. 3 is a cross-sectional view of the progressive cavity pump taken along line III-III of FIG. 1.

FIG. 1 is a perspective view of a progressive cavity pump according to an embodiment of the present disclosure, FIG. 2 is an exploded perspective view of the progressive cavity pump of FIG. 1, and FIG. 3 is a cross-sectional view of the progressive cavity pump taken along line III-III of FIG. 1.

Referring to FIGS. 1 to 3, the progressive cavity pump according to an embodiment includes a motor 100, a rotary shaft 200, a rotor 250, a stator body 500, and a support housing 300.

The rotary shaft 200 is formed to be coupled to the motor 100 and rotated. The rotor 250 is coupled to the rotary shaft 200. The rotor 250 extends in a vertical direction and has a groove formed in a spiral shape along the lengthwise direction thereof. The rotor 250 is arranged to be rotated at a position that is eccentric a certain distance with respect to a rotating center of the rotary shaft 200. Accordingly, when the rotary shaft 200 is rotated by the motor 100, the rotor 250 revolves while rotating about the rotating center shaft. Also, a vertical section of the rotor 250 with respect to the lengthwise direction is formed to have a circular shape at any position. A groove extending in a spiral shape is generally formed in the outer surface of the rotor 250.

The stator body 500 includes a stator 530 and a nozzle 540.

The stator 530 includes a liquid storage 531 and a rotor reception portion 533. The liquid storage 531 and the rotor reception portion 533 may be formed to extend to upper and lower directions in the stator body 500 and to store viscous liquid. A part of the rotary shaft 200 extends to a position passing the liquid storage 531 of the stator 530. The rotor 250 coupled to the rotary shaft 200 is inserted into the rotor reception portion 533. Female screw recesses 5331 are formed in the inner wall surface of the rotor reception portion 533. The inner wall surface of the rotor reception portion 533 may be formed of an elastic material so as to hermetically seal a contact surface with the rotor 250, which varies over time due to the rotation of the rotor 250, while accepting displacement caused due to the eccentric rotation of the rotor 250.

Figure 4:
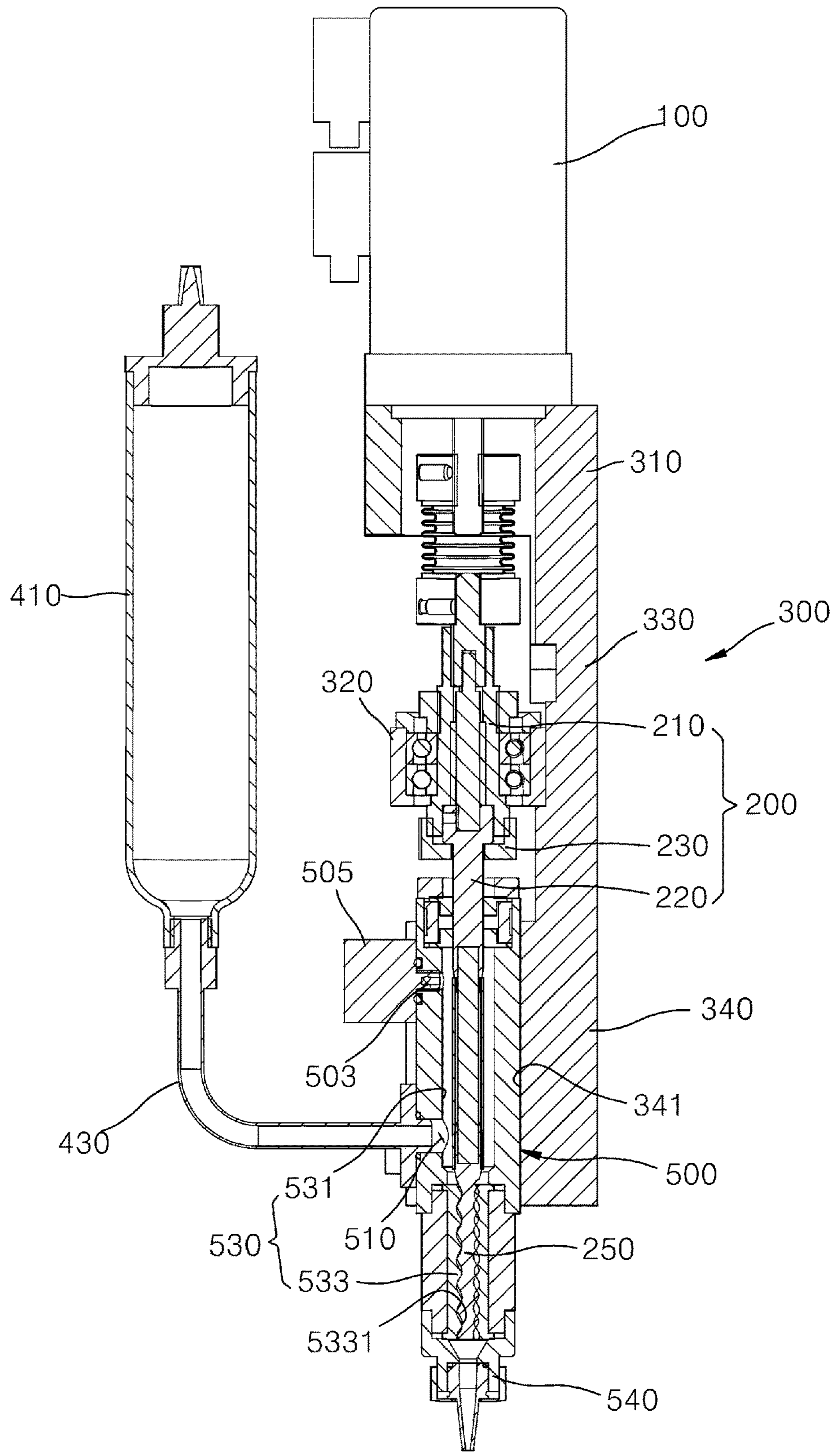
FIG. 4 is a cross-sectional view of the progressive cavity pump taken along line IV-IV of FIG. 1.

Referring to FIG. 4, a vent hole 503 is formed in the stator body 500. The vent hole 503 is formed to extend from the upper portion of the liquid storage 531 to the outer surface of the stator body 500. A vent cap 505 is fastened with the vent hole 503. When the vent cap 505 is separated from the vent hole 503, an internal pressure of the liquid storage 531 is equal to the atmospheric pressure. In the above state, a syringe 410 is pressed to supply the viscous liquid, the viscous liquid is filled in the liquid storage 531. As the viscous liquid is filled in the liquid storage 531, the air in the liquid storage 531 is discharged to outside via the vent hole 503. When the viscous liquid is appropriately filled in the liquid storage 531, a user may operate the motor 100 after blocking the vent hole 503 with the vent cap 505.

The nozzle 540 is formed at the lower portion of the stator body 500. The nozzle 540 is formed to be in communication with the lower end portion of the rotor reception portion 533 of the stator 530. A pressing force generated in the rotor reception portion 533 due to the rotation of the rotor 250 discharges the viscous liquid through the nozzle 540.

Referring to FIGS. 1 and 2, the support housing 300 may be formed to support the motor 100, the rotary shaft 200, and the stator body 500, respectively. The support housing 300 may include a motor support 310, a shaft support 320, a vertical support 330, and a stator support 340.

The motor support 310 is coupled to the motor 100 to support the motor 100. The shaft support 320 is formed so that the rotary shaft 200 passes thereby. The shaft support 320 supports the rotary shaft 200 to be rotatable. In the embodiment, the shaft support 320 is formed to support the rotary shaft 200 to be rotatable by using a bearing. The stator support 340 is disposed on the lower side of the shaft support 320. The stator support 340 is coupled to the stator body 500 to be attachable/detachable, so as to support the stator body 500. The vertical support 330 is formed to extend in the upper and lower directions so as to be respectively coupled the motor support 310, the shaft support 320, and the stator support 340.

In the embodiment, the stator support 340 is formed to have the structure shown in FIGS. 1 to 3, and then is coupled to the stator body 500 to be attachable and detachable and supports the stator body 500. That is, the stator support 340 of the support housing 300 includes a stator seating portion 341 and a fixing knob 343. The stator seating portion 341 is formed so that the stator body 500 is seated thereon. That is, the stator seating portion 341 extends in the upper and lower directions and has opened upper and lower portions. Also, the stator seating portion 341 is formed to have one surface opened in the side direction, and thus, interference with peripheral components may be prevented when seating the stator body 500 on the stator seating portion 341. The fixing knob 343 is formed in a bolt shape so as to be screw-coupled through the stator seating portion 341. While the stator body 500 is seated on the stator support 340, when the fixing knob 343 is fastened in a screw type through the stator seating portion 341, the stator body 500 is fixed to the stator seating portion 341.

The viscous liquid is stored in the syringe 410 and is supplied to the liquid storage 531 of the stator 530. The syringe 410 is connected to the stator body 500 via a syringe pipe 430. That is, the viscous liquid stored in the syringe 410 is transferred to the stator 530 through the syringe pipe 430. The stator body 500 has a feeding flow path 510 connecting the syringe pipe 430 to the liquid storage 531, and thus, the viscous liquid transferred through the syringe pipe 430 is transferred to the rotor reception portion 533 through the liquid storage 531.

In addition, the rotary shaft 200 includes a first rotary shaft 210 and a second rotary shaft 220. When attaching/detaching the stator body 500 to/from the stator support 340, the first rotary shaft 210 and the second rotary shaft 220 are coupled to each other to be attachable/detachable so that a part of the rotary shaft 200 and the rotor 250 connected to the rotary shaft 200 may be also attached/detached along with the stator body 500. The first rotary shaft 210 corresponds to an upper portion of the rotary shaft 200, and is coupled to the motor 100 and rotatably supported by the shaft support 320 of the support housing 300. An upper end portion of the second rotary shaft 220 is coupled to the first rotary shaft 210 to be attachable/detachable and a lower end portion of the second rotary shaft 220 is coupled to the rotor 250.

In the embodiment, the first rotary shaft 210 and the second rotary shaft 220 are coupled to each other to be attachable/detachable by the above structures shown in FIGS. 1 to 3. A connecting groove 221 having a non-circular cross-section, that is, rectangular cross-section, is formed in the upper end portion of the second rotary shaft 220. A connecting protrusion 211 having a rectangular cross-section is formed on the lower end portion of the first rotary shaft 210, so as to be inserted into the connecting groove 221. Due to the structure of the connective groove 221 and the connecting protrusion 211, the first rotary shaft 210 and the second rotary shaft 220 are fitted with each other. in the above state, the shaft nut 230 is fastened with the first rotary shaft 210 via the second rotary shaft 220. A female screw portion is formed in the shaft nut 230. The shaft nut 230 is screw-coupled to the first rotary shaft 210 so as to fix the second rotary shaft 220 to the first rotary shaft 210. As necessary, the first rotary shaft 210 and the second rotary shaft 220 may be easily separated by unscrewing the shaft nut 230 from the first rotary shaft 210.

The second rotary shaft 220 partially includes a flexible material. As such, the second rotary shaft 220 may accept the displacement of the rotating center due to the eccentric rotor 250 through the above structure of the second rotary shaft 220.

Hereinafter, operations of the progressive cavity pump having the above structure are described below.

First, in the state shown in FIG. 1, the viscous liquid is supplied from the syringe 410 to the rotor reception portion 533. The viscous liquid is supplied to the liquid storage 531 through the syringe pipe 430 and the feeding flow path 510. Because the upper portion of the liquid storage 531 is sealed by a hermetic sealing member such as an O-ring, the viscous liquid in the liquid storage 531 is transferred only to the rotor reception portion 533 at the lower side.

As described above, when the viscous liquid is filled in the liquid storage 531 from the syringe 410, the vent hole 503 is opened so that the viscous liquid is transferred to the liquid storage 531 sequentially through the syringe pipe 430 and the feeding flow path 510. When the viscous liquid is sufficiently filled in the liquid storage 531, the vent cap 505 is fastened with the vent hole 503 to close the vent hole 503.

In the above state, when the motor 100 rotates the rotary shaft 200, the rotor 250 is rotated relative to the stator 530. The rotor 250 rotates while revolving in the stator 530, and a pressure applied in a radial direction pushes away the viscous liquid downward along the female screw recesses 5331 in the inner wall surface of the rotor reception portion 533 due to an eccentric wobbling motion of the rotor 250. Consequently, the viscous liquid pressed by the interaction between the rotor 250 and the rotor reception portion 533 is discharged through the nozzle 540.

As described above, when the motor 100 is driven and the progressive cavity pump of the embodiment is relatively moved in parallel to the material while discharging the viscous liquid through the nozzle 540, the viscous liquid may be applied to necessary locations on the material.

The viscous liquid discharged through the nozzle 540 as described above may be hardened over time, or the viscosity of the viscous liquid may change according to various environments such as temperature, humidity, etc. When the viscosity increases or the hardening is progressed, the nozzle 540 or peripheral flow path may be blocked, or the periphery of the nozzle 540 may be contaminated due to other causes. In this case, the nozzle 540 may be disassembled to be cleaned, or the rotor 250 and the stator body 500 may be disassembled to be cleaned.

Also, when a kind of material that is a target to be applied with the viscous liquid by the progressive cavity pump according to the present disclosure is changed, it may frequently necessary that a viscous liquid having different characteristics has to be applied or the progressive cavity pump having the nozzle 540 or the rotor 250 of different sizes or dynamic characteristics has to be replaced and used.

The progressive cavity pump of the present disclosure has an advantage of easily replacing or cleaning the rotor 250 and peripheral components, that is, parts of the progressive cavity pump, without entirely separating the pump from a dispenser.

As described above, the rotary shaft 200 is formed of the first rotary shaft 210 and the second rotary shaft 220 that are fastened and assembled with each other via the shaft nut 230. Therefore, when the shaft nut 230 is unscrewed, the first rotary shaft 210 and the second rotary shaft 220 may be easily separated.

In this state, when the fixing knob 343 is loosened, the stator body 500 is easily isolated from the stator seating portion 341.

As described above, by loosening the shaft nut 230 and the fixing knob 343, as shown in FIG. 2, the assembly of the syringe 410, the syringe pipe 430, the stator body 500, and the second rotary shaft 220 may be easily separated from the support housing 300. When the above components are separated as described above, the parts associated with the flow of the viscous liquid are separated from the support housing 300, and the components associated with the motor 100 and the rotation of the first rotary shaft 210 are remained to be fixed in the support housing 300.

In the above state, the components such as the rotor 250, the nozzle 540, etc. may be disassembled to wash off the viscous liquid. In some cases, when the components such as the nozzle 540, the rotor 250, etc. are replaced with components of different specifications, characteristics in an operation of applying the viscous liquid by the progressive cavity pump of the present disclosure may be changed. Also, a new viscous liquid may be supplied by replacing the syringe 410. In case of the syringe 410, the syringe 410 may be only separated from the stator body 500 to be replaced without separating the stator body 500 from the support housing 300. Also, in some cases, the viscous liquid may be continuously supplied to the syringe 410 without changing the syringe 410, so as to additionally supply the viscous liquid.

In addition, as shown in the cross-sectional view of FIG. 3, the end portion of the fixing knob 343 is formed in a protrusion shape, and a concave recess 501 is formed in the end portion of the stator body 500, to which the fixing knob 343 is fastened, so as to correspond to the protrusion of the fixing knob 343. Thus, the position of the stator body 500 with respect to the support housing 300 may be precisely adjusted and coupled only by fastening the fixing knob 343.

The motor 100 is coupled to the motor support 310 of the support housing 300, and the first rotary shaft 210 is fixedly supported by the shaft support 320 to be rotatable. Thus, the components associated with the rotation driving of the rotor 250 may be remained to be coupled to the support housing 300 even when the stator body 500 is separated. Therefore, even when the stator body 500 is separated, cleaned, and coupled again to be used or a new stator body 500 is replaced and coupled to be used, the coupling state of the motor 100 driving the progressive cavity pump and the peripheral components with respect to the dispenser or with respect to the support housing 300 may not be largely changed. Through the above configuration, according to the present disclosure, the characteristics of applying the viscous liquid of the dispenser or the rotation movement characteristics of the rotor 250 may be maintained or constantly controlled, as compared with the case in which the entire pump is replaced or reassembled according to the pump of the related art.

When using the pump having the above structure, there is no need to manufacture a mask every time for performing an etching process of a substrate, and the viscous liquid of an accurate amount may be applied to an accurate position of the substrate to perform an etch-resist application process. Thus, processing efficiency may be improved and processing costs may be reduced.

The examples of the present disclosure are described above, but the scope of the present disclosure is not limited thereto.

For example, the configuration in which the first rotary shaft 210 and the second rotary shaft 220 are coupled to be attachable/detachable may use various mechanical structures other than the structure using the shaft nut 230.

Also, in the above description, the connecting groove 221 having a rectangular cross-section is formed in the upper end portion of the second rotary shaft 220 and the connecting protrusion 211 having a rectangular cross-section is formed on the lower end portion of the first rotary shaft 210 to be fitted into the connecting groove 221, but the rotary shaft may be configured so that a connecting groove may be formed in the first rotary shaft and a connecting protrusion is formed on the second rotary shaft. Also, the cross-sectional shapes of the connecting groove and the connecting protrusion may not be limited to the rectangular shapes, but may be variously modified to triangular shapes, hexagonal shapes, etc.

The configuration in which the stator body 500 is coupled to support housing 300 to be attachable/detachable may be replaced with various configurations other than the structure using the fixing knob 343. Even when the fixing knob 343 is used, the coupling structure of the fixing knob 343 may be a structure other than the types shown in FIGS. 1 to 3.

The nozzle may be coupled to the stator 530 to be detachable as shown in FIG. 3 or may be integrally formed with the stator 530.

Also, in the above description, the vent hole 503 is formed in the stator body 500 and the vent cap 505 is installed, but in some cases, a progressive cavity pump having a structure without the vent hole and the vent cap may be formed.

The progressive cavity pump according to the present disclosure may be easily disassembled for repair and maintenance, and may be easily attached to an accurate position during re-assembly.

Also, in the progressive cavity pump according to the present disclosure, main components such as the nozzle, the rotor, the stator, etc. may be easily replaced so as to easily adjust the dispensing characteristic, while the driving units such as the motor and the rotary shaft are installed in the dispenser, and thus, an idle time of the dispenser may be reduced.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A progressive cavity pump comprising: a motor; a rotary shaft coupled to the motor and rotated; a rotor eccentrically connected to the rotary shaft and rotated; a stator including a rotor reception portion that extends in up and down directions so that the rotor is inserted therein, has a female screw recess formed in an inner wall surface, and stores a viscous liquid; and a nozzle formed to be in communication with the rotor reception portion so that the viscous liquid is discharged by a pressing force that is generated in the rotor reception portion due to the rotation of the rotor, the progressive cavity pump further comprising:

a support housing including a motor support that is coupled to the motor to support the motor and a shaft support that is formed so that the rotary shaft passes and supports the rotary shaft to be rotatable;

a stator body including the stator and the nozzle and coupled to the support housing to be attachable/detachable;

a syringe storing the viscous liquid; and a syringe pipe connecting the syringe to the stator body so as to transfer the viscous liquid stored in the syringe to the stator, wherein the stator body has a feeding flow path that connects the syringe pipe to the rotor reception portion of the stator, wherein the support housing further comprises a vertical support connected to a motor support to extend in up and down directions and to be coupled to the shaft support, and a stator support coupled to the vertical support and coupled to the stator body to be attachable/detachable wherein the stator support of the support housing comprises:

a stator seating portion on which the stator body is seated; and a fixing knob having a bolt shape which fixes the stator body to the stator seating portion by screwing through the stator seating portion as a screw while the stator body is seated on the stator support, wherein the stator seating portion of the stator support in the support housing is formed to extend in the upper and lower directions and to have opened upper and lower portions, and has one surface opened toward the side direction so as to prevent interference with the stator body when the stator body is attached/detached.

2. The progressive cavity pump of claim 1, wherein the stator of the stator body further comprises a liquid storage accommodating a part of the rotary shaft, storing the viscous liquid transferred through the syringe pipe, and disposed on an upper side of the rotor reception portion to be in communication with the rotor reception portion.

3. The progressive cavity pump of claim 2, wherein the rotary shaft includes a first rotary shaft coupled to the motor and supported by the shaft support of the support housing to be rotatable, and a second rotary shaft having one end coupled to the first rotary shaft to be attachable/detachable and the other end coupled to the rotor.

4. The progressive cavity pump of claim 3, wherein the second rotary shaft includes a flexible material in at least a part thereof so as to accept a displacement of a rotating center due to eccentricity of the rotor.

5. The progressive cavity pump of claim 4, wherein a connecting groove having a non-circular cross-section is formed in an end portion of one of the first rotary shaft and the second rotary shaft, and a connecting protrusion having a shape corresponding to the connecting groove and fitted into the connecting groove is formed on an end portion of the other of the first rotary shaft and the second rotary shaft.

6. The progressive cavity pump of claim 5, wherein the rotary shaft further includes a shaft nut having a female screw portion formed therein so that the end portions of the first and second rotary shafts are fastened with each other to be attachable/detachable, and is screw-coupled to one of the first and second rotary shafts via the other.

7. The progressive cavity pump of claim 2, wherein the stator body further includes a vent hole extending from the upper portion of the liquid storage of the stator and to the outer surface of the stator body.

8. The progressive cavity pump of claim 7, wherein the stator body further includes a vent cap opening/closing the vent hole.

* * * * *